March 6, 1962 P. S. SMITH 3,023,666
MULTI-CAMERAS FOR MOSAIC PHOTOGRAPHY
Filed March 25, 1958 2 Sheets-Sheet 1
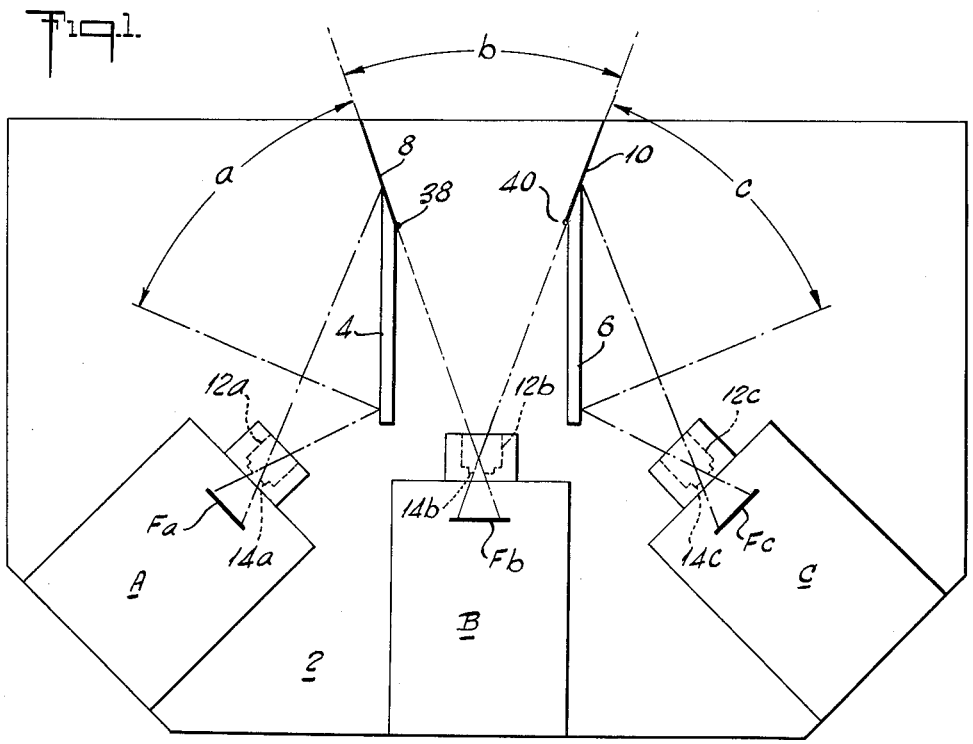
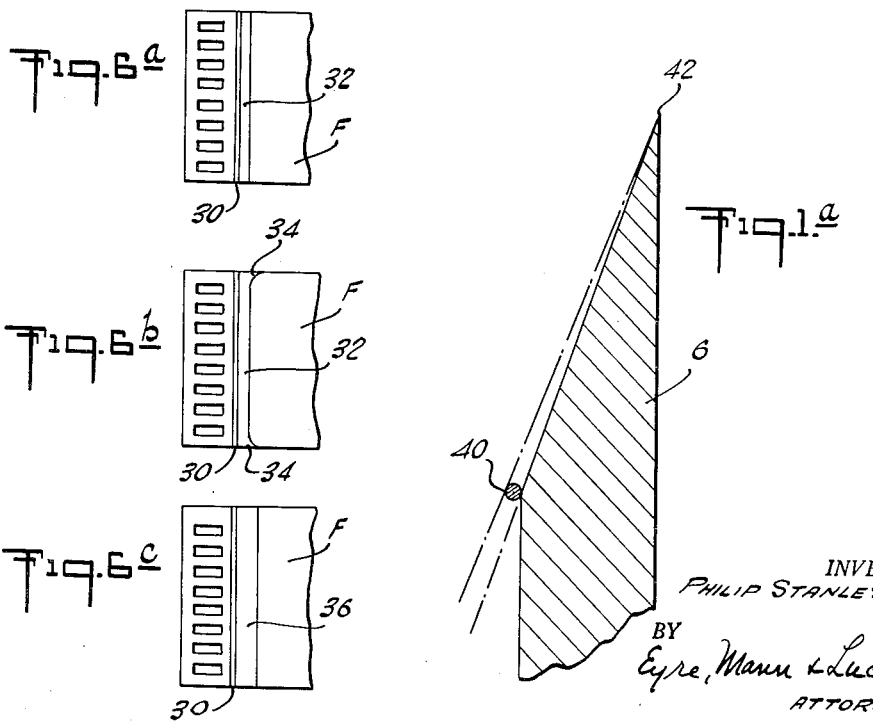
INVENTOR.
PHILIP STANLEY SMITH
BY
Eyre, Mann & Lucas
ATTORNEYS March 6, 1962 — P. S. SMITH — 3,023,666
MULTI-CAMERAS FOR MOSAIC PHOTOGRAPHY
Filed March 25, 1958 — 2 Sheets-Sheet 2
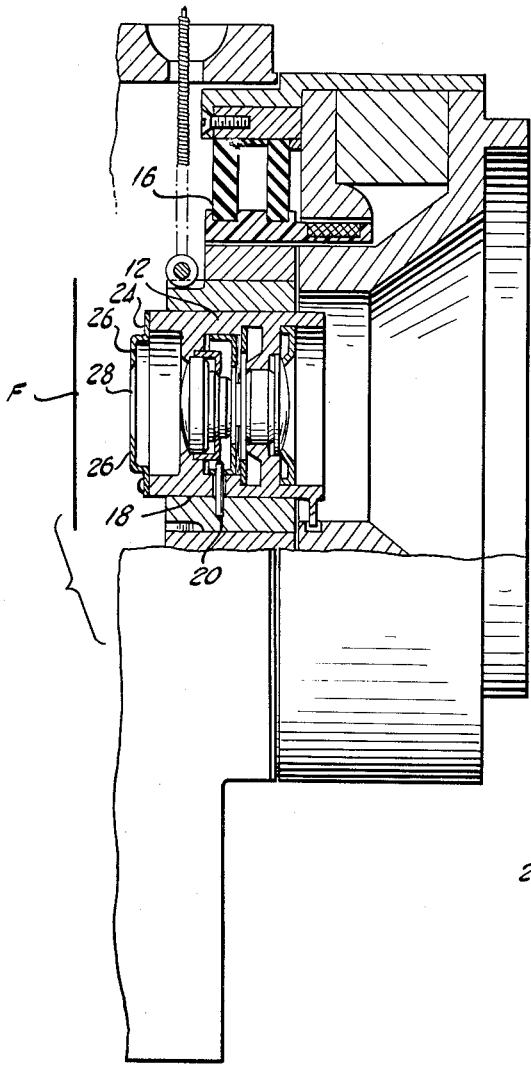
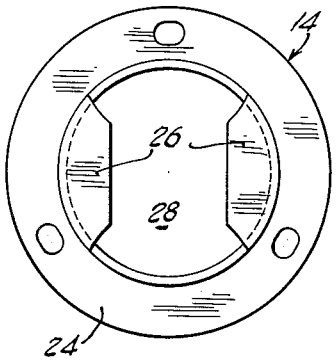
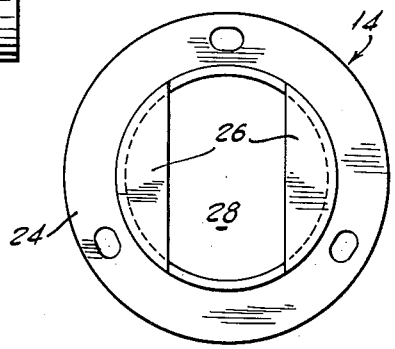
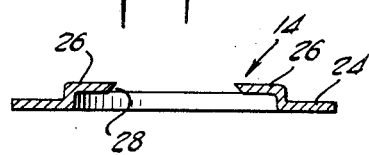
INVENTOR.
PHILIP STANLEY SMITH
BY Eyre, Mann & Lucas
ATTORNEYS

United States Patent Office 3,023,666
Patented Mar. 6, 1962

3,023,666
MULTI-CAMERAS FOR MOSAIC PHOTOGRAPHY
Philip Stanley Smith, Camden, N.J., assignor to Smith-Dieterich Corporation, a corporation of New York
Filed Mar. 25, 1958, Ser. No. 723,831
6 Claims. (Cl. 88—16.6)

The present invention relates to mosaic photography or cinematography and comprises novel means associated with the camera lenses for improving the quality of the picture viewed during projection.

In mosaic photography portions of a wide angled scene are simultaneously photographed by a plurality of cameras each positioned to cover a given portion of the scene. As described in my copending application Serial No. 570,369, filed March 8, 1956, now Patent No. 2,896,503, parallax is avoided by optically centering the scene at the entrance pupil of a single camera by means of mirrors so positioned that but one camera directly views its portion of the scene to be photographed and the other camera or cameras each views its respective portion of the scene by reflection from a mirror. After the films of the cameras have been developed and printed the original scene is reproduced by simultaneous projection.

It is important in such type of photography that there be no discontinuity at the junction of the portions of the scene photographed by the separate cameras. The cameras preferably are so positioned that there will be a transition area along the edge of each film in which objects of the scene are duplicated on films of adjoining cameras. In projection the images on these transition areas are superposed thus insuring continuity of the projected scene. The width of the transition areas of the films depends upon the aperture opening of the camera, the width decreasing with reduction in iris opening. If the width of the transition area is too little it is difficult to insure the proper overlap during projection and at times there may be portions of the scene which do not get reproduced on any film. In order to insure no variation in light intensity at the junction areas during projection the film density should vary over the entire transition area. In practice, however, the width of the area over which the density varies has been found to be less than the width of the transition area. This has resulted in bright lines called "white lines" on the screen corresponding in width to the portions of the transition areas of uniform density.

In accordance with the present invention means are provided for insuring that the transition area will always be of a width sufficient to insure against loss of picture and that the portion of the film of varied density will correspond in width to the transition area. The term "vignette" has been given to the portion of a film of graduated density and this term will be used hereinafter.

I have described in my copending application Serial No. 616,772, filed October 18, 1956, various methods for providing proper gradation of density over the transition areas of the films, each involving separate treatment of either the negative or positive films. While these methods are generally effective particularly when the camera lenses are stopped down from maximum iris opening, a multiple camera construction which insures proper gradation of density of the transition area and substantially perfect blending at the junction lines without requiring separate film treatment is, of course, to be preferred. The present invention provides such multiple camera construction.

I have now found that separate film treatment may be omitted and substantially complete suppression of junction indications in the projected scene may be achieved, even at large iris opening of the lenses, if each camera is provided with suitably spaced and shaped masking means positioned between the lens and film and so mounted on the lens unit as to move therewith upon change of focus. The masking means comprises a pair of spaced vertically extending opaque strips which attenuate light passing to the side portions of the film, the optimum spacing between the strips and the shape of the strips depending upon the exposure opening of the lens unit.

With camera lenses heretofore employed, at maximum exposure opening the effect of the periphery of the iris opening upon the limiting rays is such that the image formed upon the film is slightly barrel shaped. Consequently during projection, there was some distortion at the upper and lower edges of the junction lines. In the new camera construction of the invention this defect can be cured by shaping the masks to compensate for such image distortion. Alternatively, such distortion may be eliminated by utilizing higher speed lenses and limiting the exposure opening to values less than maximum for such higher speed lenses. More specifically, in a three camera unit constructed in accordance with my prior application Serial No. 619,597, now Patent No. 2,918,843, and now in commercial use F2.8 lenses are employed. At full iris opening, barrel-like distortion of the image on the film occurs for which, as above indicated, compensation can be achieved by addition of masks having suitably shaped side edges. By substituting F1.5 lenses for the F2.8 lenses and limiting the maximum exposure opening to that corresponding to maximum opening of the F2.8 lenses, the barrel shaped distortion can be eliminated optically, in which case straight edged masks are employed.

In the three camera unit of my said copending applications, mirrors with beveled front knife edges are employed for defining the respective fields of view of the cameras. In such system if the beveled surfaces of the mirrors are not optically black, and such black is difficult to attain, some interference with the vignetted areas of the films may be encountered as a result of light reflected from such surfaces. In accordance with another feature of the invention, a still further improvement is obtained when small baffles, for example black rods, are positioned on the back of the mirrors along the junctions of the beveled surface with the straight rear wall of the mirror. These baffles, decreasing the amount of light incident on the film from the transition areas of the scene, decrease the transparency of the vignetted portions of the projection film.

For a better understanding of the invention reference may be had to the accompanying drawings of which:

FIG. 1 is a diagrammatic top plan view of a three camera system of mosaic photography of the type with which the present invention is concerned and showing the location of the masks and baffles of the present invention;

FIG. 1a is a detailed sectional view on an enlarged scale through the beveled front edge of one of the mirrors of FIG. 1;

FIG. 2 is a horizontal sectional view of a lens mount of a camera of FIG. 1 showing a lens and mask mounted therein;

FIG. 3 is a rear view on an enlarged scale of a mask for use at maximum exposure opening of the lens iris;

FIG. 4 is a view similar to FIG. 3 but showing a mask for use at less than maximum exposure opening of the lens iris;

FIG. 5 is a transverse sectional view through either of the masks of FIGS. 3 or 4; and FIGS. 6a, 6b and 6c are parts of film explanatory of the invention, FIGS. 6a and 6b representing films taken with a camera in which masks were not employed and FIG. 6c representing film wherein the masks of the invention were employed.

In FIG. 1, to which reference may now be had, the general system of my above noted copending application Serial No. 619,597 is shown diagrammatically as comprising three cameras A, B and C positioned on a base or platform 2 for mosaic photography of a wide angle scene, the total angle of the scene comprising the angles a, b, and c. A pair of parallel wall members 4 and 6 are mounted on the platform 2 and are provided on their outer surfaces with a mirror finish for reflection to the side cameras A and C of the respective portions of the scene to be photographed. Each member 4 and 6 is provided at its forward end with a beveled surface defining the limiting angle of view of the B camera and mounted adjacent the tip or knife edge of the beveled forward ends of the wall members 4 and 6 are vanes 8 and 10 respectively, which serve to prevent unreflected light from entering the entrance pupils of the side cameras, thereby preventing formation of ghost images. The above briefly described system with the entrance pupil of the B camera positioned at the optical center of the scene and with the entrance pupils of the A and C cameras located as the mirror images of the entrance pupil of the B camera, prevents parallax when the photographed scenes are projected and prevents the appearance of ghost images in the projected scene, all as explained in the above mentioned prior application.

The lenses 12a, 12b and 12c of the respective A, B and C cameras of the system are conventional lenses, each lens unit as a whole being movable axially for change of focus.

In accordance with the present invention now to be described, masks 14a, 14b and 14c are so located and spaced with respect to the lens units and films Fa, Fb and Fc of the respective A, B and C cameras that true gradation in density is obtained over the transition area of each film. The masks are mounted directly on the lens units so as to be movable therewith with change in focus and are positioned between the last lens surface and the image plane of the film to give desired attenuation of the vignetted area. The optimum position will vary with focal length of the lens system employed as well as with iris aperture. Adjustment to minimum iris aperture accommodates maximum opening as well.

In FIG. 2 there is shown a lens mount with a lens unit and mask supported therein. The lens mount of FIG. 2 is only fragmentarily shown because the present invention is not concerned with any specific means for supporting a lens unit in a camera. Preferably each mount is constructed as described and illustrated in my said copending application wherein electromagnetic means are provided for controlling axial movement of the lens with change in focus and wherein means are provided for laterally shifting the lens unit of each of the A and C cameras with change in focus. Preferably also annular resilient means such as indicated at 16 in FIG. 2 support the lens unit to insure true axial movement thereof. The lens unit comprises a cylindrical member 18 within which are disposed the lens elements of the system and the iris diaphragm, the operating or control arm 20 of which extends through the wall of the member 18.

In accordance with the invention a mask comprising an element having an annular base 24 (see also FIGS. 3, 4 and 5) is mounted on the rear face of the member 18. In the case of the mask 14b of the B camera the outer end of the element is formed with inwardly extending lips 26 forming therebetween an aperture 28 of a width correlated to the minimum exposure opening of the iris diaphragm. As shown in FIG. 2 and also, in greater detail in FIG. 5, the opposed edges of the lips 26 defining the aperture 28 are beveled to present toward the lens tapering surfaces terminating in knife edges. The opposed knife edges of the lips 26 may be parallel throughout their length as shown in FIG. 4 or may be cut back at their upper and lower extremities as shown in FIG. 3, depending upon the speed of the lens and the calibration thereof. When the lenses of the multi-camera are such that maximum exposure opening of the iris diaphragms are utilized then, to avoid barrel-like distortion of the images on the films, the lips 26 of the masks are cut away as shown in FIG. 3. When high speed lenses are employed, for example, when 1.5 lenses are employed but calibrated as 2.8 lenses so that a lesser relative area of each lens is employed, the knife edges of the lips 26 are parallel, as shown in FIG. 4.

In the case of the A and C cameras the masks 14a and 14c are similar to mask 14b except that the lips are not equidistant from the vertical plane containing the axis of the lens, the lip which attenuates the light destined to form the transition area of the film being slightly nearer the said plane. In other words, the left lip of mask 14c of camera C will be wider than the right lip and the right lip of mask 14a of camera A will be slightly wider than the left lip.

The effect of the masks on the films of the cameras will be understood by reference to FIGS. 6a, 6b and 6c. FIG. 6a represents diagrammatically the left half of a film exposed in the B or C camera of a multi-camera set up such as that of FIG. 1 but wherein the cameras are not equipped with the masks of the invention, the camera lenses of the system being of high speed and calibrated to lower speed to avoid barrel-like distortion of the image. FIG. 6b similarly represents the left side of a film exposed in a B or C camera of a multi-camera set up such as that of FIG. 1 but without employment of the masks of the invention, the cameras being equipped with lower speed lenses adapted to be operated at maximum exposure opening of the iris diaphragm. In FIG. 6a on the film F there is a narrow band 30 which is substantially opaque but throughout which there is a slight variation in density and a wider band 32 throughout which there is a gradation of density. In FIG. 6b on the film F there is the band 30, as on the film of FIG. 6a. In FIG. 6b the band 32 through which there is gradation of density is wider adjacent the upper and lower edges of the frame, as indicated at 34, the remaining portion of band 32 being of substantially the same width as in the film of FIG. 6a. The widening of the band 32 at the areas 34 is due to the barrel-like distortion of the image resulting from obliquity of the limiting rays at the edges of the iris diaphragm. When masks such as that above described are utilized in the system of FIG. 1 a film such as that diagrammatically illustrated in FIG. 6c results. In such film the generally opaque band 30 appears, as in the case of the films of FIGS. 6a and 6b, but the band through which there is a gradation of density identified by the reference numeral 36 is substantially wider than the band 32 on films exposed in systems wherein masks are not employed. This increase in width in the graded density band which is due to the knife edges of the masks and attenuation of light thereby, insures that during projection there will be complete blending of the projected images at the junction lines between projected images, no "white line" appearing in the projected scene. The masks attenuate, rather than block, light rays passing to the films. The optimum spacing of the lips of a mask from the axis of the associated lens is a function of exposure opening of the iris diaphragm and hence the distance between iris and mask should remain fixed. Mounting of a mask directly on the lens unit insures constant distance between mask and iris. With the mask construction heretofore described, no means are shown for varying the spacing between the lips of the mask and the axis of the lens unit with change in exposure opening of the diaphragm. Such means could be provided, if desired, but the same result can be more simply attained by replacement of a mask of one spacing dimension with a mask of a different spacing dimension when the cameras are to be operated at a different light level. Practically, however, masks having dimensions correct for the minimum exposure opening, are adequate in most instances. This is because the "white lines" indicative of too narrow vignettes, have heretofore appeared in projection primarily when the cameras had been operated with minimum exposure opening.

As a specific example of a commercial set up the following data is given.

With a lens in the B camera having an E.F of 26.93 mm. the spacing of each lip of a suitable mask from the axis of the lens is .258", the lip thickness at the base of the beveled edge thereof is .031" and the outer surface of the mask is spaced .392" from the plane of the film at infinite focus. Using lenses of the same E.F for the A and C cameras, the spacing of the beveled edge of the right lip of mask 14a and of the left lip of mask 14c from the center line or axis of the lens is .254" and of the other lip of each mask from the center line .258". Each mask is positioned at the same distance from the plane of the film.

In addition to the improvement effected by the use of the above described masks on the lens units of the multi-camera unit a further improvement is obtained by the use of light baffles on the beveled edges of the mirrors 4 and 6 (see FIGS. 1 and 1a). The baffles avoid interference with the transition areas on the film of the B camera by protecting the film of the B camera from light reflected from the beveled edges of the mirrors which, in any practical set up, are not truly optically black.

The baffles 38 and 40, in the particular embodiment of the invention illustrated in the drawings, comprise small rods positioned along the junction of the un-mirrored side of the respective wall members 4 and 6, with the beveled surface thereof. As shown in FIG. 1a, the baffle 40 blocks off rays to the lens unit of the B camera through a small angle determined by the diameter of the rod, the angle of bevel and the thickness of the wall member. If the angle of the knife edge 42 of the wall 6 is 20°, for example, and that is about the smallest practical angle for machining, the diameter of the baffle may be such as to block rays through an angle of 2.46°, making the total photographic angle 22.46°, which is an angle normally employed in mosaic photography. Baffles of other than circular cross section could, of course be employed.

From the foregoing description it will be apparent that the present invention provides an improved multi-camera construction suitable for practical mosaic photography that overcomes defects heretofore present in prior art construction and insures the production of projection films of superior quality.

The following is claimed:

1. In a multiple camera mechanism for mosaic cinematography including a plurality of lens units axially movable for change of focus and positioned to view adjoining sections of a scene to be photographed, said lens units being so positioned that the scene sections overlap to provide transition areas on the films having duplicate images to be superimposed upon projection, the improvement comprising masking means mounted on the rear of each lens unit so as to be movable therewith and comprising opaque strips positioned at opposite sides of the vertical plane containing the axis of the lens unit for attenuating light rays originating in the neighborhood of the junction of the scene sections and passing to said transition areas, wherein each lens unit contains a high speed lens calibrated as a lens of lower speed and wherein said opaque strips have parallel edges spaced from said vertical plane and bevelled toward the lens unit.

2. In a multiple camera mechanism for mosaic cinematography including a plurality of lens units axially movable for change of focus and positioned to view adjoining sections of a scene to be photographed, said lens units being so positioned that the scene sections overlap to provide transition areas on the films having duplicate images to be superimposed upon projection, the improvement comprising masking means mounted on the rear of each lens unit so as to be movable therewith and comprising opaque strips positioned at opposite sides of the vertical plane containing the axis of the lens unit for attenuating light rays originating in the neighborhood of the junction of the scene sections and passing to said transition areas, wherein said opaque strips are cut away at their upper and lower ends to compensate for barrel-like distortion occurring at full iris opening of the lens unit, intermediate the cut-away portions the edges of said strips being parallel and bevelled toward the lens unit.

3. In a multiple camera mechanism for mosaic cinematography including a plurality of lens units axially movable for change of focus and positioned to view adjoining sections of a scene to be photographed, said lens units being so positioned that the scene sections overlap to provide transition areas on the films having duplicate images to be superimposed upon projection, the improvement comprising masking means mounted on the rear of each lens unit so as to be movable therewith and comprising opaque strips positioned at opposite sides of the vertical plane containing the axis of the lens unit for attenuating light rays originating in the neighborhood of the junction of the scene sections and passing to said transition areas, a vertical wall member having a mirrored surface so positioned with respect to one of said lens units that such unit views its section of the scene by reflection and an adjoining lens unit views its section of the scene directly, the vertical edge of said wall member remote from said lens units being bevelled to define one side of the field of view of said adjoining lens unit, a baffle on the bevelled edge of the wall member positioned to prevent light reflected from the bevelled edge from reaching said last mentioned lens unit and interfering with the light distribution to the transition areas of the films, said baffle comprising a black rod extending along the base of the bevelled edge of the wall member.

4. A plurality of lens units for a multiple camera mechanism for mosaic cinematography wherein said lens units are so positioned that each unit views an adjoining section of a scene to be photographed with the fields of view overlapping to provide transition areas on the films carrying duplicate images to be superimposed upon projection each unit comprising a cylindrical member enclosing lens elements and an iris diaphragm, the lens elements of each unit comprising a high speed lens calibrated as a lens of lower speed so that less than the total viewing area of the lens is exposed at maximum opening of the iris diaphragm, masking means mounted on the rear of the cylindrical member and interposed between the lens and the film to be exposed therethrough, said masking means comprising opaque strips having parallel edges positioned in spaced relationship along opposite sides of the vertical plane containing the axis of the unit, said parallel edges being bevelled toward the lens unit whereby light rays originating in the neighborhood of the junction of the scene sections are attentuated by the bevelled edges as the rays pass thereby and uniform gradation of density is provided in the transition areas of each film.

5. A structure in accordance with claim 4 which includes three cameras in the multiple camera mechanism positioned to view three adjoining scene sections, the opaque strips on the lens unit of the central camera and each of the strips nearest the central camera on the lens unit of the adjacent cameras being of substantially equal width, and the remaining strips remote from the central camera on the lens units of the adjacent cameras being of relatively narrower width.

6. A plurality of lens units for a multiple camera mechanism for mosaic cinematography wherein said lens units are so positioned that each unit views an adjoining section of a scene to be photographed with the fields of view overlapping to provide transition areas on the films carrying duplicate images to be superimposed upon projection, each unit comprising a cylindrical member enclosing lens elements and an iris diaphragm, the lens elements of each unit comprising a lens the speed of which is so calibrated to the iris diaphragm that substantially the total viewing area of the lens is exposed at maximum opening of the iris diaphragm, masking means mounted on the rear of the cylindrical member and interposed between the lens and the film to be exposed therethrough, said masking means comprising opaque strips having parallel edges positioned in spaced relationship along opposite sides of the vertical plane containing the axis of the unit, the upper and lower ends of each of the parallel edges being cut away from the corresponding ends of the other to eliminate barrel-like distortion produced in the upper and lower portions of the transition areas of the films at maximum opening of the iris diaphragm, said parallel and cut away edges being bevelled toward the lens unit whereby light rays originating in the neighborhood of the junction of the scene sections are attentuated by the bevelled edges as the rays pass thereby and uniform gradation of density is provided in the transition areas of each film.

References Cited in the file of this patent

UNITED STATES PATENTS

| | | |
|---|---|---|
| 72,627 | Gage | Dec. 24, 1867 |
| 545,423 | Chase | Aug. 27, 1895 |
| 678,490 | Hug | July 16, 1901 |
| 1,163,549 | Leonard | Dec. 7, 1915 |
| 1,254,579 | Collet | Jan. 22, 1918 |
| 1,372,645 | Cooper | Mar. 22, 1921 |
| 1,533,433 | Linden | Apr. 14, 1925 |
| 1,545,869 | Weidert | July 14, 1925 |
| 1,591,484 | Grieves | July 16, 1926 |
| 1,808,352 | Hollen | June 2, 1931 |
| 2,008,924 | Owens | July 23, 1935 |
| 2,583,030 | Waller et al. | Jan. 22, 1952 |
| 2,754,722 | Howell et al. | July 17, 1956 |
| 2,828,664 | Hoch | Apr. 1, 1958 |
| 2,931,267 | Hoch | Apr. 5, 1960 |

FOREIGN PATENTS

| | | |
|---|---|---|
| 298,615 | Great Britain | Jan. 13, 1930 |
| 385,423 | France | Mar. 16, 1908 |
| 636,540 | France | Jan. 14, 1928 |